(12) United States Patent
Lee

(10) Patent No.: US 11,002,378 B2
(45) Date of Patent: May 11, 2021

(54) VALVE, AIRCRAFT, LAUNCH VEHICLE, AND VEHICLE INCLUDING THE SAME

(71) Applicant: KOREA AEROSPACE RESEARCH INSTITUTE, Daejeon (KR)

(72) Inventor: Joong Youp Lee, Daejeon (KR)

(73) Assignee: Korea Aerospace Research Institute, Daejeon (KR)

( * ) Notice: Subject to any disclaimer, the term of this patent is extended or adjusted under 35 U.S.C. 154(b) by 33 days.

(21) Appl. No.: 16/491,665

(22) PCT Filed: Sep. 5, 2017

(86) PCT No.: PCT/KR2017/009676
§ 371 (c)(1),
(2) Date: Sep. 6, 2019

(87) PCT Pub. No.: WO2018/190475
PCT Pub. Date: Oct. 18, 2018

(65) Prior Publication Data
US 2020/0003326 A1 Jan. 2, 2020

(30) Foreign Application Priority Data
Apr. 14, 2017 (KR) .................. 10-2017-0048425

(51) Int. Cl.
*F16K 27/02* (2006.01)
*F16K 1/36* (2006.01)
(Continued)

(52) U.S. Cl.
CPC ............. *F16K 27/02* (2013.01); *F16K 1/36* (2013.01); *F16K 1/42* (2013.01); *F16K 31/124* (2013.01); *F15B 13/0405* (2013.01)

(58) Field of Classification Search
CPC . F16K 1/42; F16K 1/36; F16K 31/124; F16K 27/02; F15B 13/0405
See application file for complete search history.

(56) References Cited

U.S. PATENT DOCUMENTS 1,538,912 A * 5/1925 Taylor ................. F16K 1/36
251/217
3,273,579 A * 9/1966 Koculyn ............ F16K 31/124
137/80
(Continued)

FOREIGN PATENT DOCUMENTS

GB         941421 A * 11/1963 ............ F16K 1/36
KR  10-2006-0117650 A    11/2006
(Continued)

*Primary Examiner* — Umashankar Venkatesan
(74) *Attorney, Agent, or Firm* — Rabin & Berdo, P.C.

(57) ABSTRACT

The present invention provides a valve including: an inlet unit IL; an outlet unit OL perpendicular to the inlet unit; and an opening/closing unit. The opening/closing unit includes: a rod to open or close the discharge port while extending or retracting in the discharge port in a flow direction of the fluid, having a poppet to open or close the discharge port, and having a piston to be pressed by a pilot gas; a body having a guide to accommodate the rod and guide the extension and retraction of the rod, and pressing spaces into which the pilot gas is introduced; and a solenoid valve to supply the pilot gas into the pressing spaces, in which the opening/closing unit has no spring, and in which a diameter of a seat, which comes into contact with the poppet in the outlet unit, is greater than a diameter of the guide.

16 Claims, 8 Drawing Sheets

(51) Int. Cl.
    *F16K 31/124*     (2006.01)
    *F16K 1/42*     (2006.01)
    *F15B 13/04*     (2006.01)

(56) References Cited

U.S. PATENT DOCUMENTS

| | | | | |
|---|---|---|---|---|
| 3,286,979 | A * | 11/1966 | Brown | F16K 27/02 251/118 |
| 4,161,187 | A * | 7/1979 | Bauer | F16K 1/34 137/375 |
| 2002/0134441 | A1 * | 9/2002 | Kusumoto | F16K 1/36 137/625.3 |
| 2014/0367601 | A1 * | 12/2014 | Rada | F16K 1/465 251/333 |
| 2015/0285382 | A1 * | 10/2015 | Kienreich | F16K 1/42 251/333 |

FOREIGN PATENT DOCUMENTS

| | | |
|---|---|---|
| KR | 10-2007-0007718 A | 1/2007 |
| KR | 10-1147815 B1 | 5/2012 |
| KR | 10-2012-0092130 A | 8/2012 |
| KR | 10-1525442 B1 | 6/2015 |

* cited by examiner

VALVE, AIRCRAFT, LAUNCH VEHICLE, AND VEHICLE INCLUDING THE SAME

TECHNICAL FIELD

The present invention relates to an ultrathin on-off valve having a high flow rate property, and particularly, to a thin valve excellent in weight, shape, and operating characteristics in comparison with a ball valve or a globe valve, and to a launch vehicle an aircraft, and a vehicle including the same.

BACKGROUND ART

In general, a valve is used to seal or release a pressure of a fluid, and there are various types of valves such as a ball valve, a globe valve, and a solenoid valve. The solenoid valve is configured to seal a pressure of a fluid with a force of an elastic body such as a spring and to release the pressure by applying electric power to a solenoid and pulling a valve made of a magnetic material with a force stronger than the elastic body.

Because electric power needs to be consistently applied to the solenoid to maintain an opened state of the solenoid valve, the solenoid valve cannot be applied to an artificial satellite, a guided weapon, a projectile, or the like, where the use of electric power is extremely restricted, and as a result, there is a problem in that heat generated from the solenoid affects peripheral equipment when electric power is consistently applied.

In order to solve the problem, a solenoid latch valve using a permanent magnet has been proposed. The solenoid latch valve (hereinafter, referred to as a latch valve) using the permanent magnet maintains a closed or opened state of the valve by using a polarity of the permanent magnet. The latch valve controls the closed or opened state of the valve by instantaneously flowing an electric current through a coil to the extent that magnetic flux of the permanent magnet may be cancelled out. Because the latch valve maintains the closed or opened state of the valve by using the magnetic flux of the permanent magnet, it is not necessary to consistently apply electric power, such that the latch valve may thus be applied to a system in which a supply of electric power is restricted, and the latch valve has an advantage of solving the problem with heat generated from the coil.

However, because a stroke of the latch valve cannot be increased due to the characteristic of the structure using the magnetic flux of the permanent magnet, there is a problem in that the latch valve cannot be applied to a fluid flowing at a high flow rate under a high pressure. The stroke refers to a distance that the valve moves to be closed or opened. A flow path of the valve needs to be increased to control a fluid flowing at a high flow rate under a high pressure because a force for maintaining the closed state is increased and a large stroke is required as the flow path is increased. For this reason, in order to control a fluid flowing at a high flow rate under a high pressure in the related art, the latch valve needs to be increased in size so that the solenoid constituting the latch valve generates a great force, and a weight of the latch valve is inevitably increased to the extent of the increased size.

Therefore, the latch valve directly using the permanent magnet is inevitably and restrictively used for a system, such as a small-sized satellite, configured to control a fluid flowing at a low flow rate under a low pressure, and as a result, there is a problem in that it is difficult to apply the latch valve to a large-sized satellite, a large-sized guided weapon, or a large-sized projectile using a fluid flowing at a high flow rate under a high pressure.

In addition, there are the ball valve and the globe valve. The ball valve has a high flow coefficient but has a problem in that frictional force is high when the valve operates, which causes an increase in driving torque.

FIG. 1 illustrates a ball valve in the related art. A body 10 of the ball valve is formed in a circular ring shape, and a pair of seat rings 20 is tightly inserted into the body 10. In this case, the pair of seat rings 20 is joined together, and an inner circumferential surface of the joined seat rings 20 is formed as a spherical surface. The seat ring 20 may be made of a soft material such as Teflon, and various types of materials, such as polyether ether ketone or metal, suitable for conditions of use may be used.

Further, a ball 30 is operably seated on the inner circumferential surface of the joined seat rings 20, and a through hole 35 having the same inner diameter as a bore in a conveying pipe (not illustrated) is formed in the ball 30, such that as the ball 30 is rotated, the through hole 35 formed in the ball 30 allows a flow of a fluid in the conveying pipe or the ball 30 blocks the flow of the fluid in the conveying pipe.

However, the ball valve has a relatively higher flow coefficient than other types of valves but requires high driving torque because high frictional force occurs due to the characteristics of the ball valve when the valve operates. In particular, in a pipe system in which a pressure difference is large, a high force is applied to the ball valve, and a considerably high frictional force occurs, and as a result, there is a problem in that a size of an actuator and a weight of the valve are increased to that extent.

In addition, the globe valve (right angle valve) has a lower flow coefficient than the ball valve, and a low driving torque is applied because a low frictional force is generated when the globe valve operates. However, there is a problem in that the flow coefficient of the globe valve is lower than that of the ball valve due to the characteristics of the globe valve. Accordingly, there is a need for development on an on-off valve having a high flow rate property and a thin structure so as to be used for a projectile, an aircraft, a vehicle, and the like.

DISCLOSURE

Technical Problem

The present invention has been made in an effort to solve the above-mentioned problems, and an object of the present invention is to provide a thin valve having a high flow rate property and a small volume.

Further, another object of the present invention is to provide a valve capable of maintaining an opened state of the valve even in a situation in which it is impossible to separately transmit power due to a malfunction of the valve in a projectile, an aircraft, a vehicle, or the like.

Technical Solution

The present invention provides a valve including: an inlet unit IL having therein an inlet port into which a fluid is introduced; an outlet unit OL disposed to be perpendicular to the inlet unit and having a discharge port through which the fluid is discharged; and an opening/closing unit 100 and 110 disposed in a longitudinal direction of the outlet unit and configured to allow or block a flow of the fluid, in which the opening/closing unit includes: a rod 110 configured to open or close the discharge port while extending or retracting in the discharge port in a flow direction of the fluid, having, at one end thereof, a poppet 130 configured to open or close the discharge port, and having, at the other end thereof, a piston 120 configured to be pressed by a pilot gas; a body 100 having a guide 140 configured to accommodate therein the rod and guide the extension and retraction of the rod, and pressing spaces S1 and S2 into which the pilot gas is introduced; and a solenoid valve S configured to supply the pilot gas into the pressing spaces, in which the opening/closing unit has no spring, and in which a diameter of a seat 170, which comes into contact with the poppet in the outlet unit, is greater than a diameter of the guide 140.

A cross section of the poppet has a pressing surface P having a doughnut shape and an area made by subtracting an area of a second circle having a diameter equal to a diameter of the guide from an area of a first circle having a diameter equal to a diameter of the seat, and the poppet presses the seat by a difference between a fluid pressure in the inlet port and a fluid pressure in the discharge port which are applied to the pressing surface.

The diameter of the seat and the diameter of the guide may be set with a ratio of 0.88<(Diameter of Guide/Diameter of Seat)<0.96.

The pressing spaces S1 and S2 are divided into a first pressing space and a second pressing space by the piston, and the body has first and second channels through which the pilot gas is supplied into the first and second pressing spaces.

A friction portion 105, which protrudes in a ring shape toward a center of the body 100, is provided on an inner circumferential surface of the body 100 so as to adjoin an outer circumferential surface of the rod, and an O-ring 106 is provided on a part of the rod that adjoins the friction portion.

A flow force of the fluid applied to the poppet may be higher than a frictional force of the friction portion applied to the rod, such that the valve is prevented from being closed by the flow force even in a state in which an overall pressure of the pilot gas is eliminated due to a malfunction of the valve.

In addition, the present invention provides a launch vehicle, an aircraft, and a vehicle each including the above-mentioned valve.

Advantageous Effects

With the configuration of the present invention, it is possible to consistently maintain the opened state of the valve even in a situation in which it is impossible to transmit power due to a malfunction of the valve in a projectile, an aircraft or the like.

In addition, in view of comparison between the valve according to the present invention and a ball valve or the like, the valve according to the present invention has an advantage of having the thin structure in which a flow rate for opening or closing the valve is high and a volume of the valve is small.

In addition, because the valve according to the present invention has no spring as a constituent component, there is an advantage in that the valve may be light in overall weight and have a compact structure having a short stem.

DESCRIPTION OF MAIN REFERENCE NUMERALS OF DRAWINGS

Figure 1:
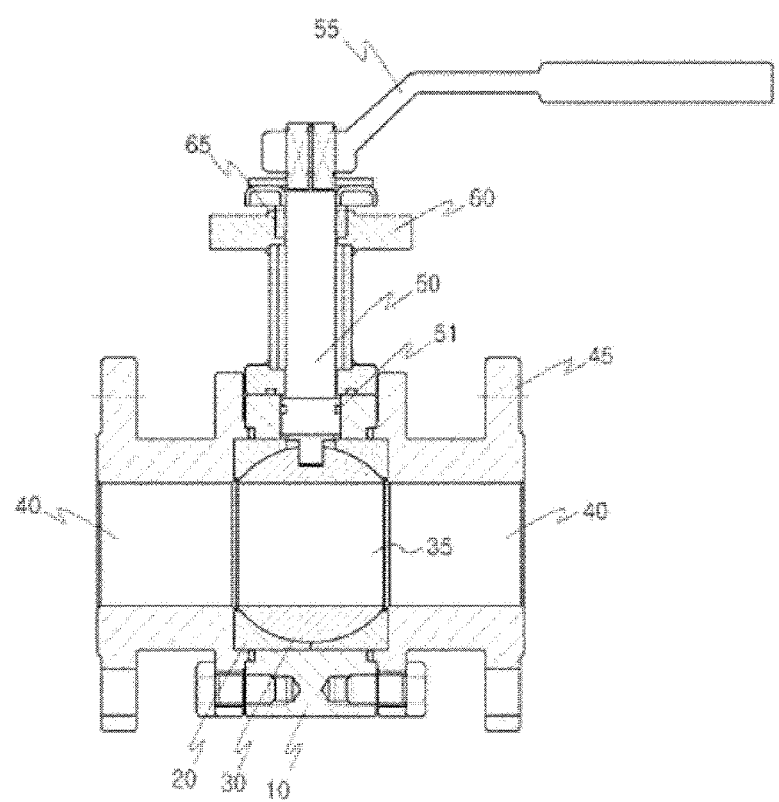
FIG. 1 is a view illustrating a structure of a ball valve in the related art.

100: Body
110: Rod
120: Piston
130: Poppet
140: Guide
150: Pilot
170: Seat
S1, S2: Pressing space
P: Pressing surface Best Mode Other objects, particular advantages, and novel features of the present invention will be more clearly understood from the following detailed description and the exemplary embodiments with reference to the accompanying drawings. In addition, the terms used herein are defined considering the functions in the present invention and may vary depending on the intention or usual practice of a user or an operator. Therefore, the definition of the terms should be made based on the entire contents of the technology of the present invention.

In denoting reference numerals to constituent elements of the respective drawings, it should be noted that the same constituent elements will be designated by the same reference numerals, if possible, even though the constituent elements are illustrated in different drawings. In addition, in the description of the present invention, the specific descriptions of publicly known related configurations or functions will be omitted when it is determined that the specific descriptions may obscure the subject matter of the present invention.

Figure 2:
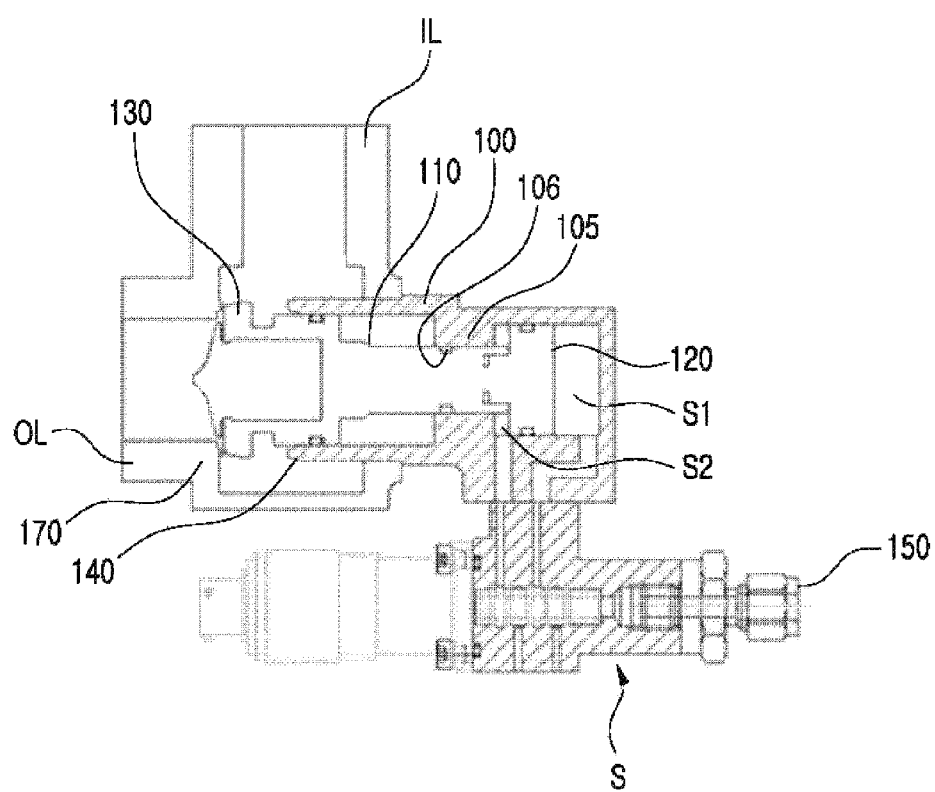
FIG. 2 is a cross-sectional view illustrating a neutral state of an on-off valve according to the present invention.
Figure 3:
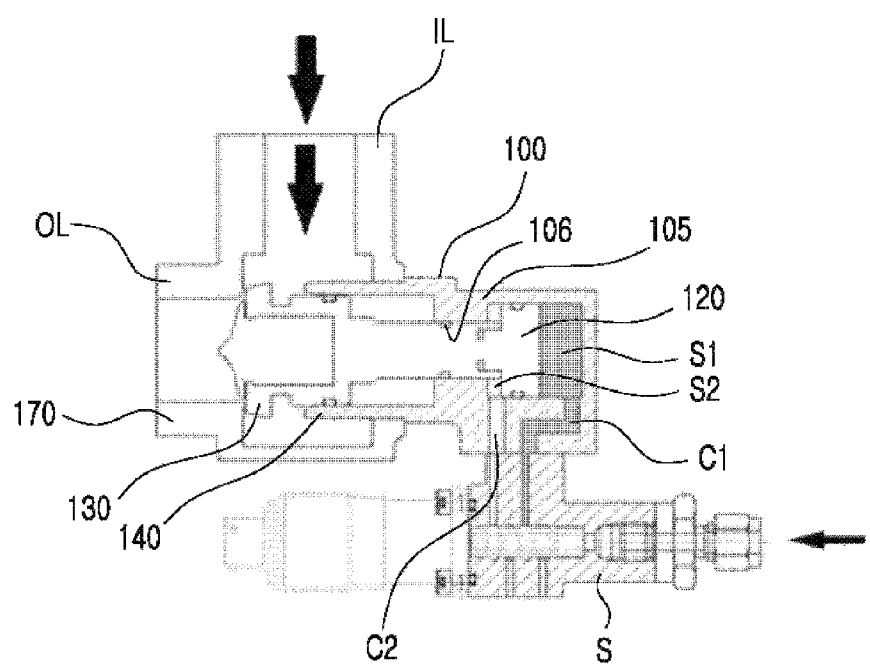
FIG. 3 is a cross-sectional view illustrating an initial state of the on-off valve according to the present invention.
Figure 4:
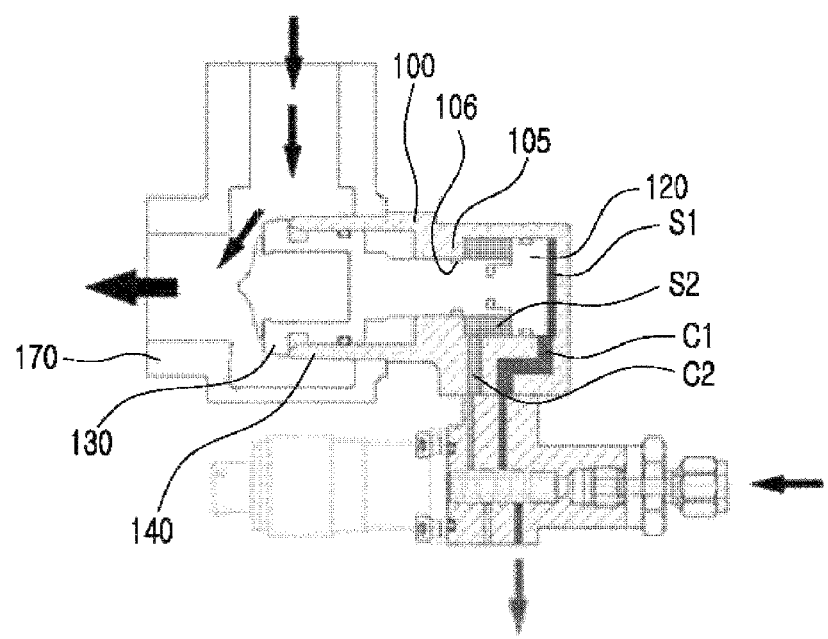
FIG. 4 is a cross-sectional view illustrating an opened state of the on-off valve according to the present invention.
Figure 5:
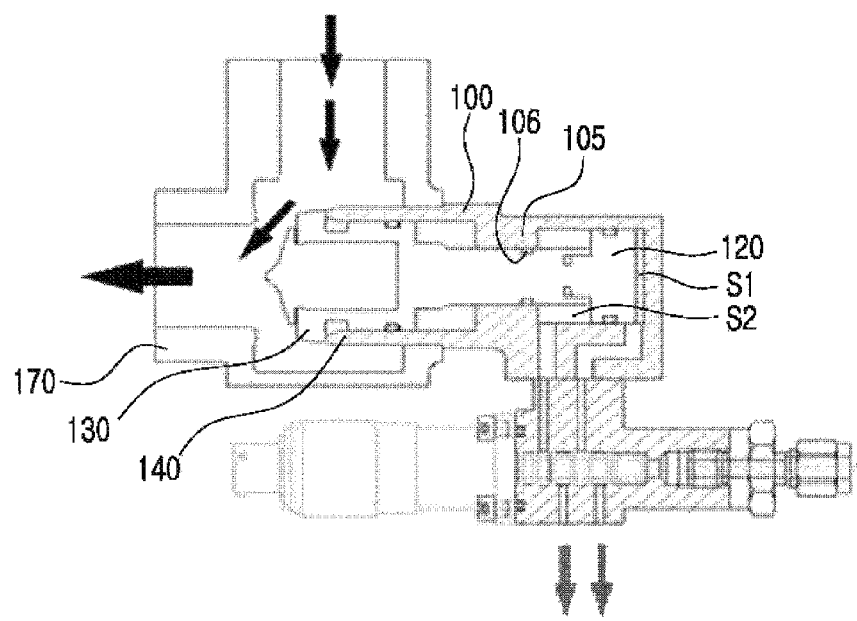
FIG. 5 is a view illustrating a state in which the opened state of the on-off valve according to the present invention is maintained.
Figure 6:
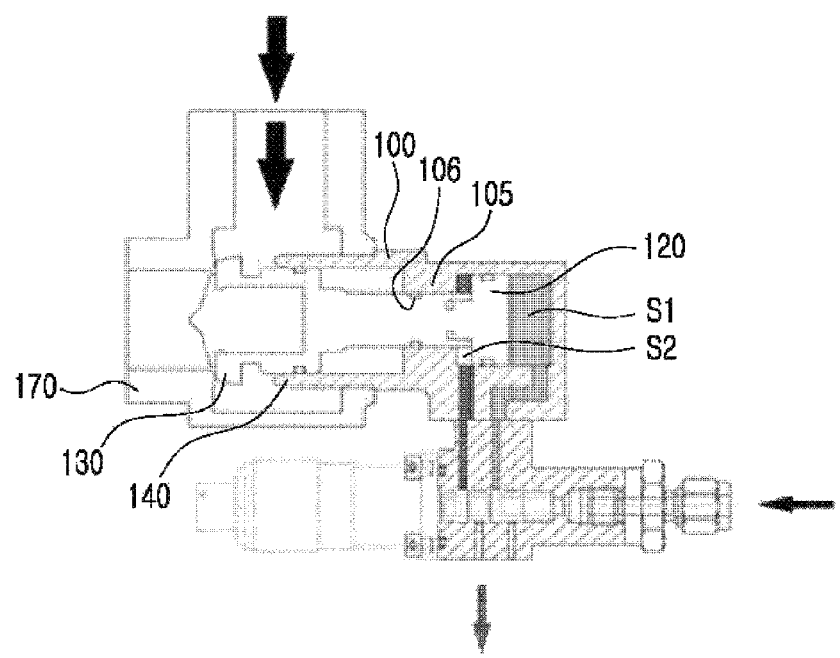
FIG. 6 is a cross-sectional view illustrating a closed state of the on-off valve according to the present invention.

FIG. 2 is a cross-sectional view illustrating a neutral state of an ultrathin on-off valve according to the present invention, FIG. 3 is a cross-sectional view illustrating an initial state of the ultrathin on-off valve according to the present invention, FIG. 4 is a cross-sectional view illustrating an opened state of the ultrathin on-off valve according to the present invention, FIG. 5 is a view illustrating a state in which the opened state of the ultrathin on-off valve according to the present invention is maintained, and FIG. 6 is a cross-sectional view illustrating a closed state of the ultrathin on-off valve according to the present invention.

As illustrated in FIG. 2, an ultrathin on-off valve according to the present invention includes an inlet unit IL into which a fluid is introduced, an outlet unit OL from which the fluid is discharged, and an opening/closing unit 100 and 110 configured to allow or block a flow of the fluid introduced from the inlet unit.

An inlet port into which the fluid is introduced is formed in the inlet unit IL, and a discharge port from which the fluid introduced from the inlet unit is discharged is formed in the outlet unit OL. The fluid is discharged while a direction of the fluid is changed, and the inlet port and the discharge port may be formed to form a right angle therebetween. The opening/closing unit is disposed in a longitudinal direction of the outlet unit, that is, disposed to be perpendicular to the inlet unit and configured to allow or block the flow of the fluid. The opening/closing unit 100 and 110 includes a body 100 disposed in the longitudinal direction of the outlet unit, and a rod 110 accommodated in the body and configured to open or close the discharge port while extending or retracting in the discharge port in a flow direction of the fluid.

The rod 110 has, at one end thereof, a poppet 130 configured to open or close the discharge port, and the rod has, at the other end thereof, a piston 120 configured to be pressed by a pilot gas. The body 100 has therein a guide 140 configured to accommodate the poppet 130, which perform the extending-retracting operation, and guide the extending-retracting operation, and pressing spaces S1 and S2 into which the pilot gas is introduced. The pressing spaces are formed in a part of the body 100 in which the piston 120 is accommodated, and the pressing spaces S1 and S2 are divided, by the piston, into a first pressing space S1 and a second pressing space S2. The first pressing space is a space into which the pilot gas is introduced during an operation of closing the valve, and the pilot gas in the first pressing space presses the piston toward one side, such that the poppet closes the discharge port to block the flow of the fluid. The second pressing space is a space into which the pilot gas is introduced during an operation of opening the valve, and the pilot gas in the second pressing space presses the piston toward the other side, such that the poppet opens the discharge port to allow the flow of the fluid. The body has first and second channels C1 and C2 through which the pilot gas is supplied into the first and second pressing spaces from a pilot.

Further, the on-off valve according to the present invention includes a solenoid valve S and a pilot 150 to supply the pilot gas into the pressing spaces, but the opening/closing unit has no spring. One of the most excellent features of the present invention is that a normal closed (NC) state is maintained without spring and thus a compact valve structure is implemented, and this feature will be described below.

Further, in the valve according to the present invention, a friction portion 105, which protrudes in a ring shape toward a center of the body 100, is provided on an inner circumferential surface of the body 100 so as to adjoin an outer circumferential surface of the rod at a middle portion of the rod, and an O-ring 106 provided on the rod adjoins the friction portion.

Hereinafter, an operation of the valve according to the present invention will be described with reference to the drawings.

First, referring to FIG. 2, the on-off valve according to the present invention maintains the neutral state which is the normal closed (NC) state made by a frictional force between the O-ring 106 and the friction portion 105. It can be seen that a front end pressure is applied to the poppet 130 such that a sealed state may be maintained in the initial valve state. The state illustrated in FIG. 2 is a case in which the front end pressure in the on-off valve is low (it can be seen that the pressure is low from comparison in size between the arrows in FIG. 3). With the structure in which the low pressure presses the poppet 130, it is possible to maintain an initial sealed state.

That is, the state of the on-off valve illustrated in FIG. 2 is a valve neutral state, a state before the pilot gas is inputted, and a state in which the driving solenoid valve S is in an OFF state. Further, in this state, a diameter of the seat 170 is equal to or larger than an inner diameter of the guide 140, such that the sealed state is initially maintained by the front end pressure in terms of equilibrium of force.

Figure 7:
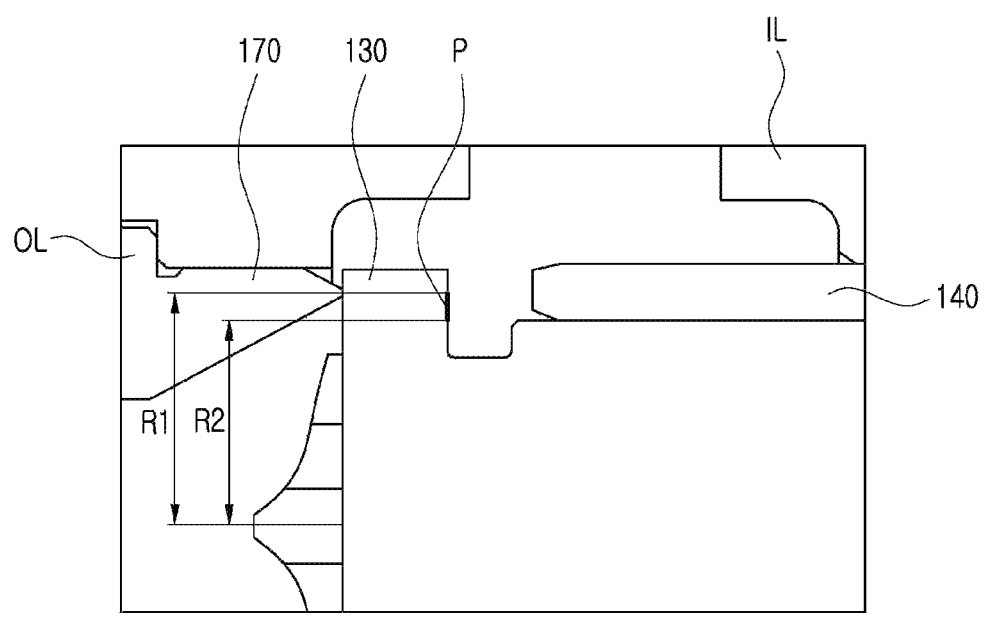
FIG. 7 is an enlarged view of a seat and a poppet of the on-off valve according to the present invention.
Figure 8:
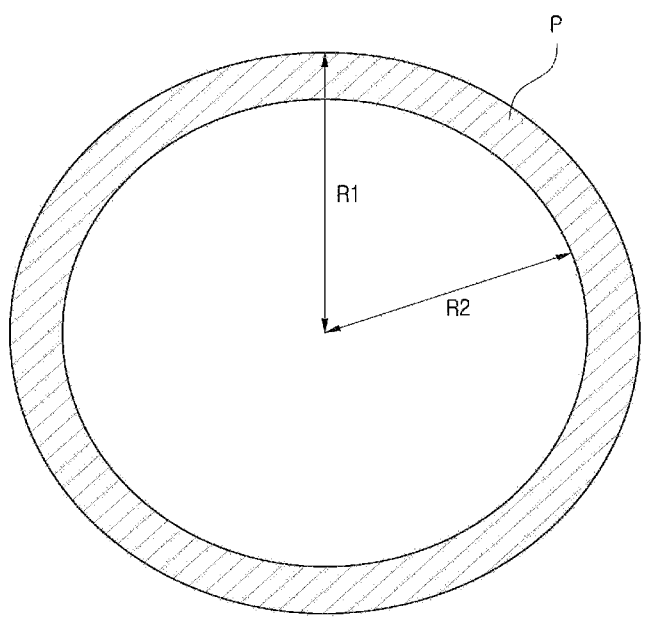
FIG. 8 is a view illustrating a pressing surface formed by a difference in inner diameter between the seat and a guide of the on-off valve according to the present invention.

A relationship between the diameter of the seat 170 and the diameter of the guide 140 will be described with reference to FIGS. 7 and 8. FIG. 7 is an enlarged view of the seat and the poppet of the on-off valve according to the present invention, and FIG. 8 is a view illustrating a pressing surface made by a difference in inner diameter between the seat and the guide of the on-off valve according to the present invention.

As illustrated in FIG. 7, a radius of the seat 170 is indicated by R1, a radius of the guide 140 is indicated by R2, and R1 is slightly larger than R2. Further, it can be seen that the fluid, which is to pass through the valve, is present in the inlet port of the inlet unit (under a pressure higher than the atmospheric pressure), and air is present under the atmospheric pressure in the discharge port of the outlet unit.

If R1=R2 in FIG. 7, the force applied to the poppet 130 and the force applied to the seat 170 are cancelled out, and the poppet cannot maintain the sealability with the pressure of the fluid, and as a result, a spring for separately maintaining the sealability needs to be provided. That is, the force of the spring needs to press the poppet toward the seat to maintain the sealability. If there is no spring, a leakage occurs from the inlet to the outlet. In this case, if the spring needs to be separately provided, there is a problem in that a weight of the valve is increased, and the valve has a long stem, such that a volume of the valve is increased.

If R1>R2 in FIG. 7, there is a pressing surface P having an area made by subtracting the diameter of the guide from the diameter of the seat 170. That is, the sealability is maintained as a pressure is applied to the pressing surface P having an area having a doughnut shape. In this case, the pressure applied to the pressing surface is a pressure corresponding to a difference between a pressure of the fluid in the inlet port and the atmospheric pressure in the outlet port. As the pressure presses the poppet toward the seat, the valve is closed. As illustrated in FIG. 8, a surface pressure having a doughnut shape corresponding to a difference between R1 and R2 is applied to the poppet. That is, if R1>R2, the sealability may be maintained to the extent of the surface pressure of the area having a doughnut shape even though there is no separate spring in the valve.

However, because the actuator of the valve needs to be able to open the poppet with a low force, a magnitude of the pressing surface needs to be restricted to some extent. That is, the diameter of the seat and the diameter of the guide are more appropriately set, such that the pressure of the fluid at the valve inlet side presses the pressing surface, and the poppet is sufficiently opened with the force of the actuator, such that the actuator is light in weight and compact and has a short stem and an overall light weight because there is no spring.

If R1>>R2 in FIG. 7, the force is applied to the entire area made by subtracting the diameter of the seat from the diameter of the poppet, and the surface pressure is generated to that extent, and as a result, the surface pressure is very strongly applied. That is, because of the pressure at the valve inlet side and the high surface pressure, a large force is required for the actuator to that extent, and the diameter of the piston needs to be increased and the pressure of the actuator needs to be increased to open the poppet, and as a result, there is a problem in that the actuator is increased in size and weight.

Therefore, in the valve according to the present invention, the case of R1>R2 is preferable. Specifically, according to a result of performing an experiment to find out an appropriate ratio between the diameter of the seat and the diameter of the guide, it can be seen that the case of 0.88<(Diameter of Guide/Diameter of Seat)<0.96 is most preferable. That is, according to a result of measuring the pressure applied to the actuator during the process of opening the valve while forcibly applying a fluid pressure of 20 bar or 40 bar to 220 bar to the inlet port of the valve and changing the diameter of the seat and the diameter of the guide, it is ascertained that a preferable operation is performed when the diameter of the guide is 88% to 96% of the diameter of the seat. That is, it is preferred that the diameter of the seat and the diameter of the guide satisfy 0.88<(Diameter of Guide/Diameter of Seat)<0.96.

FIG. 3 is a cross-sectional view illustrating an initial state of the on-off valve according to the present invention. In the initial state in FIG. 3, the pilot gas (blue in the drawing) is introduced into the first pressing space S1 in the body 100 and presses the piston 120 to bring the poppet into close contact with the seat and to implement the closed state, and the driving solenoid valve is in the OFF state. In the initial state in FIG. 3, even though the fluid forms a high pressure (indicated by the bold arrow) at the front end of the valve, that is, in the inlet port of the valve, the closed state of the valve is more securely maintained because the pilot gas is introduced into the first pressing space, and the pressure of the pilot gas presses the piston, such that the force applied to the poppet 130 is low in terms of equilibrium of force. As a result, there is no leakage of the fluid toward the discharge port.

FIG. 4 is a cross-sectional view illustrating an opened state of the ultrathin on-off valve according to the present invention. The opened state of the on-off valve is a state (blue) in which the pilot gas is introduced into the second pressing space S2 and presses the piston in a direction in which the valve is opened, and the driving solenoid valve S is in the ON state. That is, when the driving solenoid valve is turned on, the pressure of the pilot gas applied to the upper portion of the piston (first pressing space) is eliminated, and the pressure of the pilot gas is applied to the lower portion of the piston (second pressing space). In this case, the poppet 130 connected to the piston 120 is completely opened, and then the flow is formed, such that the fluid introduced into the inlet port at the upper side based on the drawing passes through the valve and is discharged to the discharge port at the left side based on the drawing. Further, according to the on-off valve according to the present invention, the above-mentioned appropriate ratio is set between the diameter of the seat 170 and the diameter of the guide 140, and as a result, the on-off valve is structured to be opened even though a low pressure is applied to the piston in terms of equilibrium of force.

FIG. 5 is a view illustrating a state in which the opened state of the ultrathin on-off valve according to the present invention is maintained. This state means that the driving solenoid valve S is inoperable. That is, FIG. 5 illustrates that the opened state of the valve according to the present invention is maintained even in a state in which the pilot 120 cannot be pressed because the solenoid valve is inoperable for some reasons. In this case, a flow force applied to the poppet 130 is designed to be higher than a frictional force applied to the friction portion 105 of the body and the rod 110, such that the valve in the opened state is prevented from being autonomously closed, and the opened state of the valve is maintained. In this way, the opened valve may not be closed by the flow force even though the overall pressure of the pilot gas is eliminated due to a malfunction in the system caused by some reasons. In particular, the opened state of the valve may be continuously maintained even in a state in which a supply of the pressure of the pilot gas is not performed or an overall gas pressure is eliminated due to a malfunction in an electric power system for a projectile, an aircraft, a vehicle, or the like.

FIG. 6 is a cross-sectional view illustrating a closed state of the on-off valve according to the present invention. The state in FIG. 6 in a state in which the pilot gas (blue) is introduced into the upper portion of the piston 120 (first pressing space) and presses the piston in a direction in which the on-off valve is closed. The driving solenoid valve S is switched from the ON state to the OFF state, the pressure of the pilot gas applied to the lower portion of the piston 120 (second pressing space) is eliminated, and the pilot pressure (blue) is inputted to the upper portion of the piston to block the flow of the fluid that passes through the valve.

With the above-mentioned structure and the above-mentioned operational principle, the valve according to the present invention has the following effects.

1. It is possible to implement an optimum structure and an ultrathin shape without a spring. That is, the ultrathin structure (short stem) may be implemented because there is no spring. In general, the on-off valve is provided with the spring and positioned at the NC or NO position. However, the ultrathin on-off valve according to the present invention is structured such that the poppet is positioned by the front end pressure in terms of equilibrium of force, and as a result, a spring is not required.

2. It is possible to maintain the sealability in the initial state because the diameter of the seat is appropriately larger than the inner diameter of the guide. The valve may be stably opened by the pilot by adjusting the ratio between the diameter of the seat and the inner diameter of the guide, and this configuration is more advantageous than the ball valve that requires high driving torque when there is a pressure at the front end of the valve.

3. The opened state of the poppet (the opened state of the valve) may be maintained even though the pilot gas is removed when there is a predetermined pressure in the main flow path from the inlet port to the discharge port, such that the opened valve may not be closed by the flow force even though the overall pressure of the pilot gas is eliminated due to a malfunction in the system.

The ultrathin valve according to the present invention may be used for an aircraft, a projectile, or the like, and the valve according to the present invention may be used for a fuel system for a vehicle because there will be a need for the ultrathin valve in the field of the fuel system for a vehicle in view of the trend toward a reduction in weight of the vehicle.

The invention claimed is:

1. A valve comprising:
an inlet unit having therein an inlet port into which a fluid is introduced;
an outlet unit disposed to be perpendicular to the inlet unit and having a discharge port through which the fluid is discharged; and an opening/closing unit disposed in a longitudinal direction of the outlet unit and configured to allow or block a flow of the fluid, wherein the opening/closing unit comprises:

a rod configured to open or close the discharge port while extending or retracting in the discharge port in a flow direction of the fluid, having, at one end thereof, a poppet configured to open or close the discharge port, and having, at the other end thereof, a piston configured to be pressed by a pilot gas;

a body having a guide configured to accommodate therein the rod and guide the extension and retraction of the poppet, and having pressing spaces into which the pilot gas is introduced; and a solenoid valve configured to supply the pilot gas into the pressing spaces, wherein the opening/closing unit has no spring, wherein a diameter of a seat, which comes into contact with the poppet in the outlet unit, is greater than a diameter of the guide, and wherein the diameter of the seat and the diameter of the guide satisfy the following range:

0.88<(Diameter of Guide/Diameter of Seat)<0.96.

2. The valve of claim 1, wherein a cross section of the poppet has a pressing surface having a doughnut shape and an area made by subtracting an area of a second circle having a diameter equal to a diameter of the guide from an area of a first circle having a diameter equal to a diameter of the seat, and the poppet presses the seat by a difference between a fluid pressure in the inlet port and a fluid pressure in the discharge port which are applied to the pressing surface.

3. A launch vehicle comprising the valve according to claim 2.

4. An aircraft comprising the valve according to claim 2.

5. A vehicle comprising the valve according to claim 2.

6. The valve of claim 1, wherein the pressing spaces are divided into a first pressing space and a second pressing space by the piston, and the body has first and second channels through which the pilot gas is supplied into the first and second pressing spaces.

7. A launch vehicle comprising the valve according to claim 6.

8. An aircraft comprising the valve according to claim 6.

9. A vehicle comprising the valve according to claim 6.

10. The valve of claim 1, wherein a friction portion, which protrudes in a ring shape toward a center of the body, is provided on an inner circumferential surface of the body so as to adjoin an outer circumferential surface of the rod, and an O-ring is provided on a part of the rod that adjoins the friction portion.

11. A launch vehicle comprising the valve according to claim 10.

12. An aircraft comprising the valve according to claim 10.

13. A launch vehicle comprising the valve according to claim 1.

14. An aircraft comprising the valve according to claim 1.

15. A vehicle comprising the valve according to claim 1.

16. A valve comprising:

an inlet unit having therein an inlet port into which a fluid is introduced;

an outlet unit disposed to be perpendicular to the inlet unit and having a discharge port through which the fluid is discharged; and an opening/closing unit disposed in a longitudinal direction of the outlet unit and configured to allow or block a flow of the fluid, wherein the opening/closing unit comprises:

a rod configured to open or close the discharge port while extending or retracting in the discharge port in a flow direction of the fluid, having, at one end thereof, a poppet configured to open or close the discharge port, and having, at the other end thereof, a piston configured to be pressed by a pilot gas;

a body having a guide configured to accommodate therein the rod and guide the extension and retraction of the poppet, and having pressing spaces into which the pilot gas is introduced; and a solenoid valve configured to supply the pilot gas into the pressing spaces, wherein the opening/closing unit has no spring, wherein a diameter of a seat, which comes into contact with the poppet in the outlet unit, is greater than a diameter of the guide, wherein a friction portion, which protrudes in a ring shape toward a center of the body, is provided on an inner circumferential surface of the body so as to adjoin an outer circumferential surface of the rod, and an O-ring is provided on a part of the rod that adjoins the friction portion, and wherein a flow force of the fluid applied to the poppet is higher than a frictional force of the friction portion applied to the rod, such that the valve is prevented from being closed by the flow force even in a state in which an overall pressure of the pilot gas is eliminated due to a malfunction of the valve.

* * * * *